No. 669,353. Patented Mar. 5, 1901.
F. W. SHURMAN.
FISH CLEANER.
(Application filed Oct. 1, 1900.)
(No Model.)
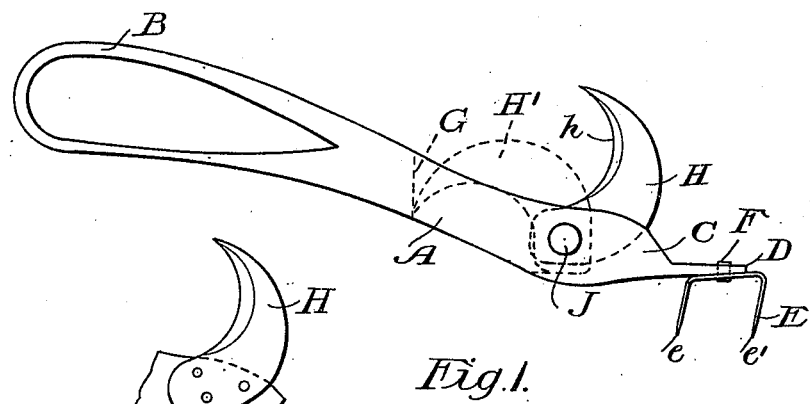
Fig. 1.
Fig. 1a.
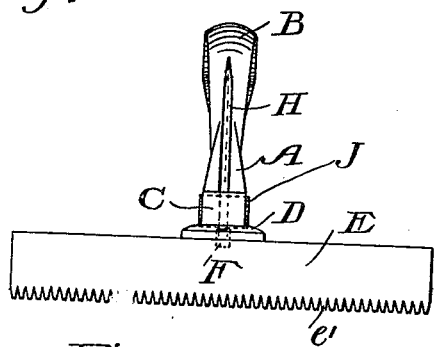
Fig. 2.
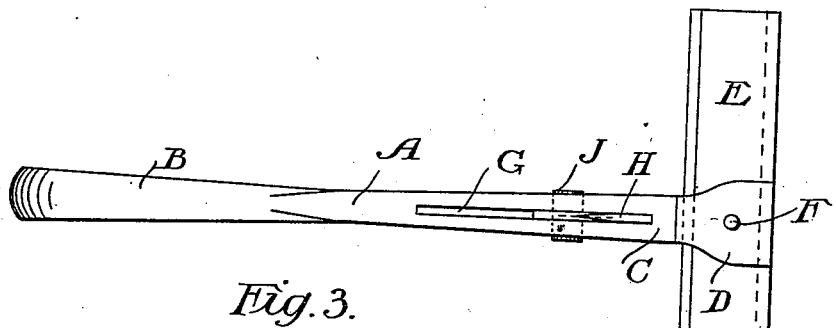
Fig. 3.
Francis W. Shurman, Inventor

United States Patent Office.

FRANCIS WILLIAM SHURMAN, OF DANDENONG, VICTORIA.

FISH-CLEANER.

SPECIFICATION forming part of Letters Patent No. 669,353, dated March 5, 1901.

Application filed October 1, 1900. Serial No. 31,612. (No model.)

*To all whom it may concern:*

Be it known that I, FRANCIS WILLIAM SHURMAN, a subject of the Queen of Great Britain, residing at Dandenong, in the Colony of Victoria, have invented a certain new and useful Fish-Cleaner, of which the following is a specification.

My invention provides a simple and handy tool or appliance for cleaning fish. The invention comprises a handle plate or frame having a cutter for opening the fish and a scraper for cleaning same.

In order that the invention may be thoroughly understood, I will now describe the same, having reference to the accompanying sheet of drawings, in which—

Figure 1 represents a side elevation of the appliance, and Fig. 1ª a modification of a part of same. Fig. 2 represents a front view of the appliance, and Fig. 3 a plan of same.

The appliance consists of a metal plate A, which is extended rearwardly to form a handle B, and the forward portion C of which has a flattened projecting portion D, to which a scraper E is secured by means of pin or bolt F. The scraper is in the form of a long plate of an inverted channel-section, which is set at right angles to the plate A, and the edges $e\ e'$ of which are sharpened and toothed or serrated, as shown in Fig. 2. The scraper-plate E is set to project oppositely to the knife-blade and so that when its edges $e\ e'$ are in a horizontal line, as when the appliance is being used, the handle B will be at a convenient level above the fish being cleaned, and both the edges $e\ e'$ be operative upon the skin of the fish. It will be noticed that the top plate of E is set slightly on the bias with respect to the downward members.

The plate A is recessed out at G, and in the forward part of this recess a knife-blade H is pivoted or hinged by means of pin J. The knife-blade projects upwardly and is curved and is pointed at its end, and its cutting edge $h$ is the inside or concave edge. This knife-blade may be pivoted somewhat after the manner of an ordinary pocket-knife, so that it can be turned to rest with its cutting edge within the recess G of the plate A, as indicated by dotted lines at H' in Fig. 1, so that it may be carried with safety. This knife-blade may, if desired, be a fixture onto the side of the plate or frame A, as indicated in Fig. 1ª, and which would form a cheaper construction than that previously described.

I prefer to construct the appliance wholly of metal; but the main portion might in some cases be constructed of other meterial with metal knife-blade and scraper.

The mode of using the appliance is obvious, the knife-blade being employed to rip or cut open the fish and remove its fins and head, and the scraper to thoroughly scrape off the scales and clean out the fish.

Having now particularly described and ascertained the nature of my said invention and in what manner the same is to be performed, I declare that what I claim is—

1. A fish-cleaner comprising a plate or frame which is extended rearward to form a handle and the forward portion of which has a flattened projecting portion and a scraper secured thereto, the plate or frame having a recess adjacent to the scraper and a cutter pivoted in such recess, substantially as and for the purposes set forth.

2. A fish-cleaner comprising a plate or frame which is extended rearwardly to form a handle and has at its forward portion a curved knife-blade and a cross scraper-plate set oppositely to the knife-blade said scraper-plate being formed of a long metal strip of inverted channel-section with serrated or toothed edges substantially as and for the purposes described.

3. A fish-cleaner comprising a plate or frame which is extended rearwardly to form a handle and has at its forward portion a recess, and a curved knife-blade pivoted in the recess, and a scraper-plate set oppositely to the knife-blade said scraper-plate being formed of a long metal strip of inverted channel-section with serrated or toothed edges substantially as and for the purposes described.

In testimony whereof I have signed my name to this specification in the presence of two subscribing witnesses.

FRANCIS WILLIAM SHURMAN.

Witnesses:
A. O. SACHSE,
A. HARKER.